United States Patent [19]

Kozlowski

[11] Patent Number: 5,331,079
[45] Date of Patent: * Jul. 19, 1994

[54] LIQUID SORBENT

[75] Inventor: Zdzislaw J. Kozlowski, Ville LaSalle, Canada

[73] Assignee: E.R.T. Environmental Research Technology K.S.P.W. Inc., Montreal, Canada

[ * ] Notice: The portion of the term of this patent subsequent to Aug. 24, 2010 has been disclaimed.

[21] Appl. No.: 41,222

[22] Filed: Mar. 31, 1993

Related U.S. Application Data

[63] Continuation-in-part of Ser. No. 815,187, Dec. 31, 1991, Pat. No. 5,239,040.

[51] Int. Cl.$^5$ .............................................. C08G 18/14
[52] U.S. Cl. ........................................ 528/48; 528/49; 528/54; 528/59
[58] Field of Search .................... 528/48, 49, 54, 59

[56] References Cited

U.S. PATENT DOCUMENTS

| | | | |
|---|---|---|---|
| 3,891,579 | 2/1975 | Cenker | 260/2.5 AW |
| 3,976,570 | 6/1976 | McCray | 210/30 A |
| 4,230,565 | 9/1980 | Faudree | 210/693 |
| 4,293,679 | 9/1981 | Cogliano | 528/48 |

FOREIGN PATENT DOCUMENTS

| | | |
|---|---|---|
| 547855 | 9/1982 | Australia . |
| 1057000 | 1/1979 | Canada . |
| 0390148 | 1/1990 | European Pat. Off. . |
| 0420515 | 3/1991 | European Pat. Off. . |
| 1270810 | 4/1968 | Fed. Rep. of Germany . |
| 1546182 | 6/1968 | France . |
| 2286839 | 2/1976 | France . |
| 1086091 | 3/1967 | United Kingdom . |
| 1200063 | 12/1970 | United Kingdom . |

*Primary Examiner*—Maurice J. Welsh
*Attorney, Agent, or Firm*—Spensley Horn Jubas & Lubitz

[57] ABSTRACT

A polyurethane particulate liquid absorbent, optionally containing microspheres, and a process for its preparation. The absorbent is suitable for use in cleaning up spilled liquids ranging from mobile ones, such as gasoline, to visconsones, such as crude oil. The absorbent and absorbed liquid are readily separated by a centrifugation step, thus providing recovered liquid, and liquid-free absorbent for re-use.

23 Claims, No Drawings

LIQUID SORBENT

CROSS-REFERENCE TO RELATED APPLICATION

This is a continuation-in-part of application Ser. No. 07/815,187 filed Dec. 31, 1991 and now U.S. Pat. No. 5,238,040.

BACKGROUND OF THE INVENTION

In the recent past, there have been several well documented instances of the inadvertent spillage of liquids causing both environmental, ecological, and even toxicological problems. Examples of spilled liquids include both oil spills, and the spillage of the materials known loosely as PCB's. For nearly all spilled liquids, methods of clean-up and disposal are known, even for relatively difficult ones, such as crude oil and PCB's. However, in order to be able to dispose of a spilled liquid, two factors, not one, are important. First, it is necessary to be able to recover the spilled liquid. Second, it is desirable to be able to carry out the recovery step in such a way that the recovered spilled liquid can be easily and relatively simply separated from any agent used in the recovery step. For example, an oil spill can be cleaned up with a water/detergent mixture, but that only transforms the problem into one of disposing of the oil/water/detergent mixture.

At present, although many clean-up methods have been proposed for dealing with spilled liquids, such as crude oil spills, there is no commercially available product which will recover a spilled liquid in an easily handleable form, and also do so in a manner permitting the simple separation of the recovered liquid from the recovery agent.

SUMMARY OF THE INVENTION

This invention seeks to overcome these difficulties by providing a particulate reusable absorbent capable of absorbing many spilled liquids, and from which the absorbed liquid can be removed by the simple process of centrifugation. The main limitation on the use of the particulate absorbent of this invention is the properties of the liquid spilled. Any liquid, such as a highly corrosive acid, which would destroy a polyurethane polymer, cannot be recovered using the product of this invention.

In a first broad aspect, this invention provides a process for preparing a polyurethane particulate liquid absorbent which comprises:

(i) reacting together at a temperature of from 180° C. to 200° C., for a time of less than 10 minutes, a prepolymer of the formula A

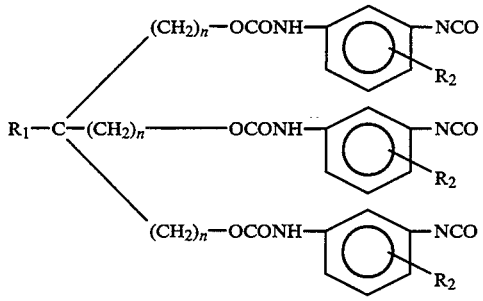

with a prepolymer of the general formula B

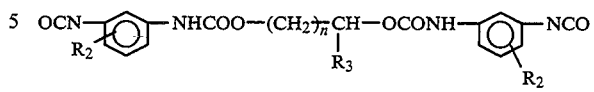

in the presence of a lower alkylester solvent of the general formula C

   C

R₁ COOR₄ in which:

n represents 1, 2, or 3;

$R_1$ represents a lower alkyl group having 1 to 6 carbon atoms;

$R_2$ represents hydrogen, or a lower alkyl group having 1 to 4 carbon atoms; and;

each of $R_3$ and $R_4$ represents a lower alkyl group having 1 to 3 carbon atoms, and when $R_2$ is other than hydrogen, it is in the meta- or para-position relative to the -NH- linkage; and wherein the weight ratio of prepolymer of formula A to prepolymer of formula B is about 3:1, and the reaction mixture contains from 22% to 25% by weight of ester solvent;

(ii) cooling the thus formed polymer;

(iii) adding thereto an alcoholic medium chosen from the group consisting of
 (a) ethanol; or
 (b) a mixture of ethanol, methanol and water containing 85% by weight ethanol, up to 15% by weight methanol, remainder water; or
 (c) ethanol containing from 4% by weight to 6% by weight isopropanol;

(iv) adding to the mixture, if desired, microspheres comprising an aluminosilicate shell containing gas such as carbon dioxide or nitrogen, and having a diameter of from 10 um to 100 um;

(v) adding thereto with mixing hexamethylene tetramine, (vi) allowing the spontaneous reaction to proceed thereafter during which a temperature in the range of 55° C. to 65° C. is developed, and during which at least some of both tile lower alkyl ester solvent, the alcoholic medium, and any water present, evaporate; and (vii) recovering a particulate polyurethane product.

Preferably, in the prepolymer of formula A:

n represents 1;

$R_1$ represents an ethyl group; and each $R_2$ represents a methyl group in the para-position relative to the -NH- linkage.

Preferably, in the prepolymer of formula B:

n represents 2;

each $R_2$ represents a methyl group in the para-position relative to the -NH- linkage;

$R_3$ represents a methyl group.

Thus, it is preferred that these prepolymers have the formulae $A_1$ and $B_1$, respectively:

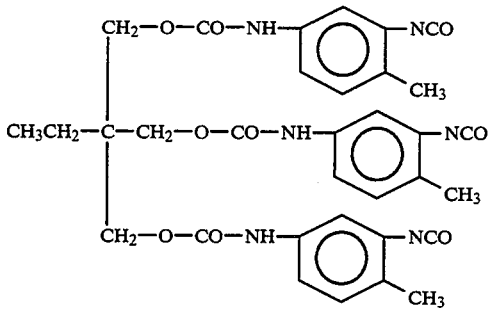

$A_1$

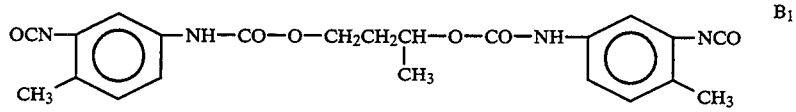

$B_1$

Preferably, in tile lower alkyl ester solvent of formula C, $R_1$ represents methyl, and $R_4$ represents ethyl; that is, the solvent is ethylacetate.

Preferably, the alcoholic medium is ethanol.

In a second broad aspect, this invention comprises tile particulate solid obtained by tile above defined process.

In a third broad aspect, this invention provides a method for recovering a liquid which comprises contacting the liquid with a particulate absorbent obtained by the above defined process for a period of time sufficient to permit absorption of the liquid by the particulate solid; removing the particulate solid containing liquid; and separating tile absorbed liquid from the solid by centrifugation.

DESCRIPTION OF THE PREFERRED EMBODIMENTS

This invention provides a particulate polyurethane polymer, which may contain microspheres. In appearance, it looks much like bread crumbs.

The process to make this absorbent product involves several steps which, briefly, are preparation of a polymer, if desired, coating of that polymer onto microspheres of gas-filled aluminoscliate, and reaction of the polymer with hexamethylene tetramine, to convert the polymer into an absorbent coating.

In the polymer preparation step, the prepolymers of formulae A and B are used. As is indicated above, although there is some flexibility of choice for these materials, the compounds of formulae $A_1$ and $B_1$, are preferred; these are commercially available materials. Similarly, it is preferred to use ethylacetate as the solvent for this first step.

Preferred reaction guantities for this step are that the ratio of prepolymer A to prepolymer B should be 3:1 on a weight basis. The amount of ester solvent used is also important, and should be in the range of 22% to 25% by weight of the reaction mixture (of ester prepolymer A, and prepolymer B). Thus, a typical reaction mix will contain about 57% by weight of prepolymer A, about 19% by weight of prepolymer B, and the remainder, about 24%, of ethyl acetate.

These materials are reacted together at a temperature in the range of 185° C. to 200° C., preferably at approximately 200° C. The reaction is also relatively fast, taking generally less than 10 minutes, but usually more than 5 minutes.

At the end of this reaction, the polymer obtained has the following characteristics (formulae $A_1$ and $B_1$ were used as the reactants in ethylacetate):

| | |
|---|---|
| 1. Solids content: | 75–78% |
| 2. NCO content: | 12.7–13.7% |
| 3. Colour & Appearance: | sticky, limpid fluid; light yellow colour |
| 4. Iodic Scale hue: | maximum 5 |
| 5. Viscosity: | 1500–3000 mPa.s at 25° C. |
| 6. Density: | 1.10–1.17 gn/cm$^3$ at 20° C. |
| 7. Free TDI content: | maximum 4% |

These properties are measured by standard methods. The NCO content and the free TDI monomer content are both measured by infrared spectrophotometric methods. The colour hue is obtained on the Garden scale using a Colormed spectrocolorimeter. The viscosity is measured at 25° C. using a Irvine Park, J & L Instruments Corp. viscometer model FNU-200.

After the polymersation step, the polymer is cooled and diluted with an alcoholic medium. Preferably, this is ethanol, but other ethanolic mixtures can be used. Alternatives are an ethanol/methanol/water blend containing 85% ethanol, methanol up to 15%, the remainder water, and ethanol containing 4% to 6% by weight of isopropanol.

The amount of alcoholic medium added is not hight, just enough to render the polymer adequately fluid. For 100 parts by weight of the polymer solution, a quantity in the range of from 5 parts to 15 parts has been found to be suitable.

When the alcohol has been blended into the cooled polymer, the microspheres are added. These microspheres are an aluminosilicate shell filled with a gas, usually carbon dioxide or nitrogen. They are obtained as a result of burning carbonaceous fuels in boilers, and are removed from the fly ash by a flotation technique, followed by drying. A desirable size range is from 10 um to 100 um diameters. If desired, the microspheres can be omitted.

To the diluted solution of polymer containing the microspheres, is then added the hexamethylene tetramine. For 100 parts by weight of the polymer solution, it is desirable to use 30 parts of hexamethylene tetramine. Shortly after addition of the hexamethylene tetramine, a spontaneous reaction occurs, usually after a few seconds. The temperature rises spontaneously to a value of from 55° C. to 65° C. As a consequence of this rise in temperature, much of the solvent added during the earlier steps (e.g. ethanol, methanol, and ethylacetate) are driven off, together with any water which might be present, to leave a relatively dry, crumbly, particulate solid mass.

Typical reaction systems which have been found to be suitable are given in the following Table. In each instance, the prepolymers used are those of formulae $A_1$ and $B_1$, above. The quantities are in parts by weight. The alcoholic medium was ethanol in each case.

TABLE

| COMPONENT | EXAMPLE 1 | EXAMPLE 2 | EXAMPLE 3 | EXAMPLE 4 |
|---|---|---|---|---|
| Polymer $A_1$ & $B_1$[1] | 100 | 100 | 100 | 100 |
| Alcoholic Medium | 10 | 10 | 12 | 5 |
| Hexamethylene tetramine | 30 | 30 | 30 | 30 |
| Microspheres | 10 | Zero | 15 | 3 |

[1]containing about 24% by weight ethylacetate

The product of this invention, both with and without the microspheres, is a solid, somewhat like bread crumbs in appearance. It is also very porous and therefore capable of absorbing many liquids. The only limitations on liquid absorbence appear to be straight forward.

First, viscosity: a viscous liquid will take far more time to soak in than a mobile one. Indeed, in some instances, for example some of tile heavier, tar containing crude oils, it may be desirable to use a diluent as well, to lower the viscosity to a desirable level.

Second, characteristics: a liquid which will react with, or otherwise degrade, the polyurethane polymer should be avoided, for example a highly corrosive acid.

A further advantageous feature of this product is that separation of absorbed liquid from it is straight forward: the particulate solid is passed through an ordinary commercial centrifuge. The liquid is thereby recovered for further processing, and the solid for re-use. The conditions required in the centrifuge can be readily determined. For a mobile liquid, such as gasoline, a centrifuge capable of 100 g is adequate; more viscous liquids, such as crude oil, will require higher g figures, and require a longer centrifuge residence time. Again, for a viscous liquid, the presence of a viscosity-reducing diluent has a direct influence on the centrifuge conditions required.

I claim:

1. A process for preparing a polyurethane particulate liquid absorbent which comprises:
   (i) reacting together at a temperature of from 180° C. to 200° C., for a tame of less titan 10 minutes, a prepolymer of the formula A

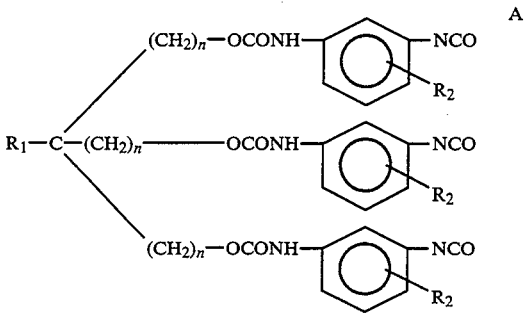

with a prepolymer of the general formula B

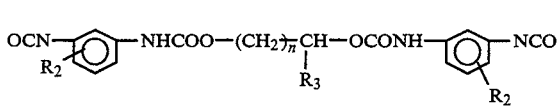

in the presence of a lower alkylester solvent of the general formula C $R_1$ COOR$_4$     C in which:

n represents 1, 2, or 3;

$R_1$ represents a lower alkyl group having 1 to 6 carbon atoms;

$R_2$ represents hydrogen, or a lower alkyl group having 1 to 4 carbon atoms; and;

each of $R_3$ and $R_4$ represents a lower alkyl group having 1 to 3 carbon atoms, and when $R_2$ is other than hydrogen, It is in the meta- or para-position relative to the -NH- linkage; and wherein the weight ratio of prepolymer of formula A to prepolymer of formula B is about 3:1, and the reaction mixture contains from 22% to 25% by weight of ester solvent;

(ii) cooling the titus formed polymer;

(iii) adding thereto an alcoholic medium chosen from the group consisting of
   (a) ethanol; or
   (b) a mixture of ethanol, methanol and water containing 85% by weight ethanol, up to 15% by weight methanol, remainder water; or
   (c) ethanol containing from 4% by weight to 6% by weight isopropanol;

(iv) adding thereto with mixing hexamethylene tetramine, (v) allowing the spontaneous reaction to proceed thereafter during which a temperature in the range of 55° C. to 65° C. is developed, and during which at least some of both tile lower alkyl ester solvent, the alcoholic medium, and any water present, to evaporate; and (vi) recovering a particulate polyurethane product.

2. A process according to claim 1, including the further step, between steps (iii) and step (iv), comprising adding to the mixture microspheres comprising an aluminosilicate shell containing gas, and having a diameter of from 10 um to 100 um.

3. A process according to claim 1 wherein the prepolymer of formula A has the formula $A_1$:

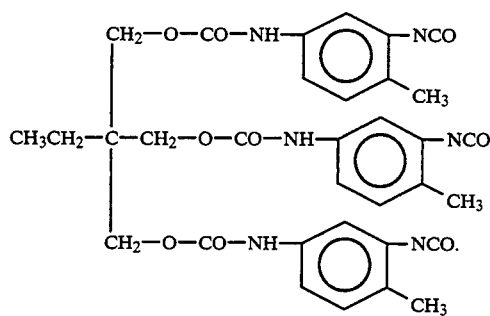

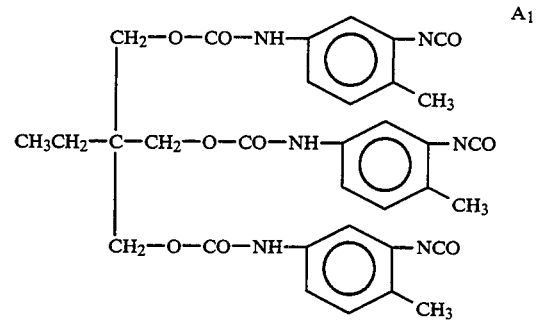

4. A process according to claim 2 wherein the prepolymer of formula A has the formula $A_1$:

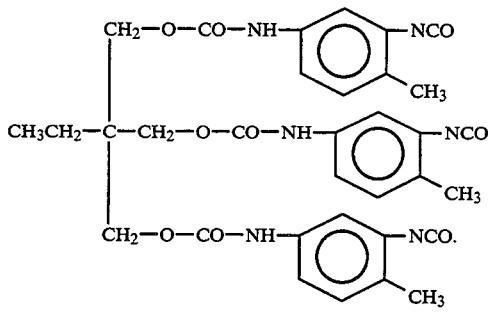

5. A process according to claim 1 wherein the prepolymer of formula B has the formula $B_1$:

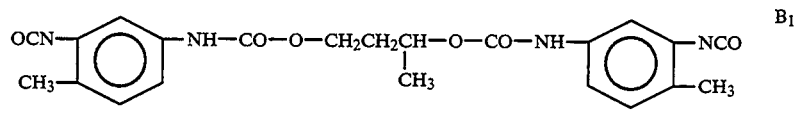

6. A process according to claim 2 wherein the prepolymer of formula B has the formula $B_1$:

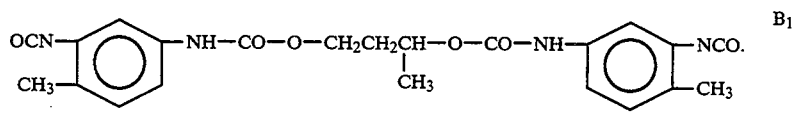

7. A process according to claim 1 wherein the lower alkyl ester solvent is ethyl acetate.

8. A process according to claim 2 wherein the lower alkyl ester solvent is ethyl acetate.

9. A process according to claim 1 wherein the prepolymer of formula A has the formula $A_1$

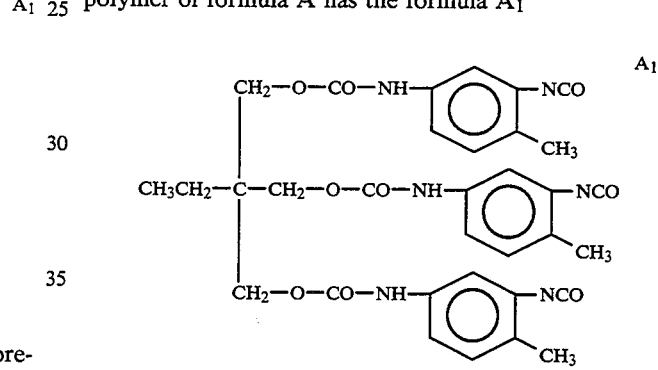

the prepolymer of formula B has the formula $B_1$

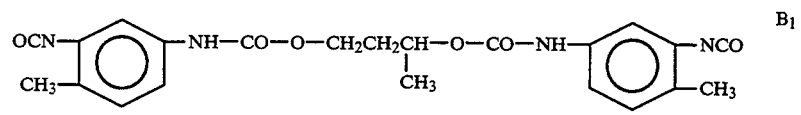

and the lower alkyl ester solvent is ethylacetate.

10. A process according to claim 2 wherein the prepolymer of formula A has the formula $A_1$ the prepolymer of formula B has the formula $B_1$

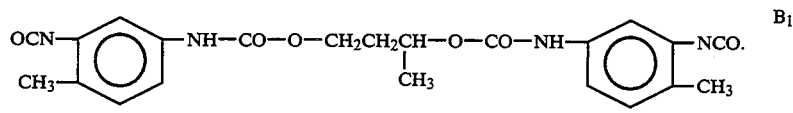

and the lower alkyl ester solvent is ethylacetate.

11. A process according to claim 1 wherein the alcoholic medium is ethanol.

12. A process according to claim 2 wherein the alcoholic medium is ethanol.

13. A process according to claim 2 wherein from about 3 to about 5 parts by weight of microspheres, per 100 parts by weight of polymer produced in step (i), are added to the reaction mixture.

14. A polyurethane particulate liquid absorbent prepared by the process of claim 1.

15. A polyurethane coated microsphere particulate liquid absorbent prepared by the process of claim 2.

16. A polyurethane particulate liquid absorbent prepared by the process of claim 9.

17. A polyurethane coated microsphere particulate liquid absorbent prepared by the process of claim 10.

18. A polyurethane coated microsphere particulate liquid absorbent prepared by the process of claim 13.

19. A method for recovering a liquid from a locus which comprises:
   (a) adding to the liquid an amount of a polyurethane particulate liquid absorbent according to claim 14 sufficient to absorb at least some of the liquid;
   (b) separating the absorbent containing absorbed liquid from any remaining unabsorbed liquid;
   (c) separating the absorbed liquid from the absorbent by a centrifugation step;
   (d) recovering the thus separated absorbed liquid; and
   (e) recovering the absorbent.

20. A method for recovering a liquid from a locus which comprises:
   (a) adding to the liquid an amount of a polyurethane particulate liquid absorbent according to claim 15 sufficient to absorb at least some of the liquid;
   (b) separating the absorbent containing absorbed liquid from any remaining unabsorbed liquid;
   (c) separating the absorbed liquid from the absorbent by a centrifugation step;
   (d) recovering the thus separated absorbed liquid; and
   (e) recovering the absorbent.

21. A method for recovering a liquid from a locus which comprises:
   (a) adding to the liquid an amount of a polyurethane particulate liquid absorbent according to claim 16 sufficient to absorb at least some of the liquid;
   (b) separating the absorbent containing absorbed liquid from any remaining unabsorbed liquid;
   (c) separating the absorbed liquid from the absorbent by a centrifugation step;
   (d) recovering time thus separated absorbed liquid; and
   (e) recovering the absorbent.

22. A method for recovering a liquid from a locus which comprises:
   (a) adding to the liquid an amount of a polyurethane particulate liquid absorbent according to claim 17 sufficient to absorb at least some of the liquid;
   (b) separating the absorbent containing absorbed liquid from any remaining unabsorbed liquid;
   (c) separating the absorbed liquid from the absorbent by a centrifugation step;
   (d) recovering the thus separated absorbed liquid; and
   (e) recovering the absorbent.

23. A method for recovering a liquid from a locus which comprises:
   (a) adding to the liquid an amount of a polyurethane particulate liquid absorbent according to claim 18 sufficient to absorb at least some of the liquid;
   (b) separating tile absorbent containing absorbed liquid from any remaining unabsorbed liquid;
   (c) separating tile absorbed liquid from the absorbent by a centrifugation step;
   (d) recovering the thus separated absorbed liquid; and
   (e) recovering the absorbent.

* * * * *